US008413749B2

(12) United States Patent
Hsu

(10) Patent No.: US 8,413,749 B2
(45) Date of Patent: Apr. 9, 2013

(54) AUXILIARY DRIVE ASSEMBLY FOR WHEELCHAIRS

(76) Inventor: Hsiang-Ling Hsu, Taipei (TW)

( * ) Notice: Subject to any disclaimer, the term of this patent is extended or adjusted under 35 U.S.C. 154(b) by 375 days.

(21) Appl. No.: 12/776,591

(22) Filed: May 10, 2010

(65) Prior Publication Data

US 2011/0155490 A1 Jun. 30, 2011

(30) Foreign Application Priority Data

Dec. 31, 2009 (TW) ................................ 98146630 A

(51) Int. Cl.
*B60K 1/00* (2006.01)

(52) U.S. Cl.
USPC ........................................ 180/65.51; 180/907

(58) Field of Classification Search ............... 180/65.51, 180/907, 908, 65.1, 6.44, 6.48, 6.5
See application file for complete search history.

(56) References Cited

U.S. PATENT DOCUMENTS 5,172,039 A * 12/1992 Owens .......................... 318/489
5,234,066 A * 8/1993 Ahsing et al. .................. 180/6.5
5,528,139 A * 6/1996 Oudet et al. ............... 324/207.2
5,665,965 A * 9/1997 Durham, III ............. 250/231.13
5,771,988 A * 6/1998 Kikutani et al. ........... 180/65.51
5,799,258 A * 8/1998 Fidanza et al. ..................... 701/1
5,818,189 A * 10/1998 Uchiyama et al. ............ 318/488
6,112,837 A * 9/2000 Kanno et al. ................... 180/6.5
6,286,616 B1 * 9/2001 Kutter ........................ 180/206.5
6,354,390 B1 * 3/2002 Uchiyama et al. ........... 180/65.1
7,383,904 B2 * 6/2008 Wu ............................ 180/65.51

* cited by examiner

*Primary Examiner* — John Walters
*Assistant Examiner* — Brian Swenson
(74) *Attorney, Agent, or Firm* — Rosenberg, Klein & Lee

(57) ABSTRACT

An auxiliary drive assembly for wheelchairs is revealed. The auxiliary drive assembly includes a wired transmission member, at least one sensor, a control circuit and a drive unit. The wired transmission member is arranged at a wheel hub on a wheel. The sensor is set on the wheel for generating a sensing signal sent to the wired transmission member. The control circuit is coupled to the wired transmission member, receiving the sensing signal and generating a control signal. The drive unit is coupled to the control circuit and receiving the control signal so as to drive the wheel hub rotating and further move the wheel. Thereby the assembly is with simple structure and the environmental interference is minimized by wired signal transmission. The sensing signal is sent to the control circuit exactly and the drive unit is controlled to rotate the wheel precisely. The wired transmission reduces the cost.

12 Claims, 5 Drawing Sheets

AUXILIARY DRIVE ASSEMBLY FOR WHEELCHAIRS

BACKGROUND OF THE INVENTION

1. Fields of the invention

The present invention relates to an auxiliary drive assembly, especially to an auxiliary drive assembly for wheelchairs.

2. Descriptions of Related Art

The progress of medical science has been so rapid that people are living longer than ever now. However, people's main organs are aging and their illness is increasing as they age. When people are sick or getting older and weaker, they are confined to beds for a long period time. This leads to disability, physical deconditioning and even bedsores. The cardiorespiratory function, large intestinal motility and the urinary system are also affected. Thus older people and handicapped people badly need mobility aids such as wheelchairs to help them move around. Wheelchairs are ideal mobility aids for the elder and the handicapped so that they can operate the wheelchairs and move independently. Thereby the convenience and safety of the wheelchair users are quite important. Most of wheelchairs available now are convenient for users to travel and having controllers for control of wheelchairs easily.

There are various types of wheelchairs. According to power sources, wheelchairs are divided into two groups-manually operated wheelchairs and electric wheelchairs. The manually operated wheelchair is run by operating a ring under an armrest of the wheelchair for driving a wheel and moving the wheelchair forward. As to the electric wheelchair, it is a wheelchair powered by an electric motor and users only need to operate a control device for adjusting direction and speed of motion. Thus the electric wheelchair is a mobility aid device that makes the movement more comfortable for users. However, users in such wheelchairs will lose the advantage of the exercise they would get pushing the manually operated wheelchairs.

Based on the reasons mentioned above, an auxiliary drive assembly for manually operated wheelchairs that enable users move the wheelchairs easily has been developed. The force users applied to the wheelchairs is detected by a force sensor so as to generate a sensing signal that is sent to a control circuit by wiredless transmission. According the sensing signal, the control circuit drives the motor for propelling wheelchair wheels and users can push the wheelchairs easily. Conventional wheelchairs with power aids do enable users to push wheelchairs easily and signals are transmitted in a wiredless way in such power aids. However, wiredless communications are very susceptible to environmental interference. Once the sensing signals are not transmitted to the control circuit precisely, the control circuit can't drive the motor properly in response to the sensing signals and users get no assistance. Moreover, the structure of conventional auxiliary drive devices for wheelchairs is complicated. Together with wiredless transmission devise, the total cost is quite expensive.

In order to overcome the above shortcomings, there is a need to provide an auxiliary drive assembly for wheelchairs that provides users assistance so that users can move the wheelchairs with reduced energy. Moreover, the present invention has a simple structure and signals are transmitted in a wired way. Thus the cost is reduced and signals are transmitted without interference in the environment. The sensing signals are sent back precisely while users moving the wheelchairs and the wheels of the wheelchairs are propelled so as to provide assistance during the movement of the wheelchairs.

SUMMARY OF THE INVENTION

Therefore it is a primary object of the present invention to provide an auxiliary drive assembly for wheelchairs in which a drive unit transmits signals in a wired way so that the interference on signal transmission is minimized and signals are sent to a control circuit exactly. Rotation of a wheel of the wheelchair is controlled precisely and users move the wheelchairs easily due to the assistance provided by the auxiliary drive assembly.

It is another object of the present invention to provide an auxiliary drive assembly for wheelchairs that has not only simple structure but also reduced manufacturing cost.

In order to achieve above objects, the auxiliary drive assembly for wheelchairs of the present invention consists of a wired transmission member, at least one sensor, a control circuit and a drive unit. The wired transmission member is arranged at a wheel hub on a wheel of the wheelchair. The sensor is disposed on the wheel and is generating a sensing signal that is sent to the wired transmission member. The control circuit is coupled to the wired transmission member, receiving the sensing signal and generating a control signal. The drive unit is coupled to the control circuit and receiving the control signal so as to drive the wheel hub rotating according to the control signal and further propel the wheel. Thereby when users move wheelchairs, the effort required is minimized due to the assistance provided by the auxiliary drive assembly. Moreover, the signals can be transmitted to the control circuit precisely. The device has a simple structure and reduced manufacturing cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1A:
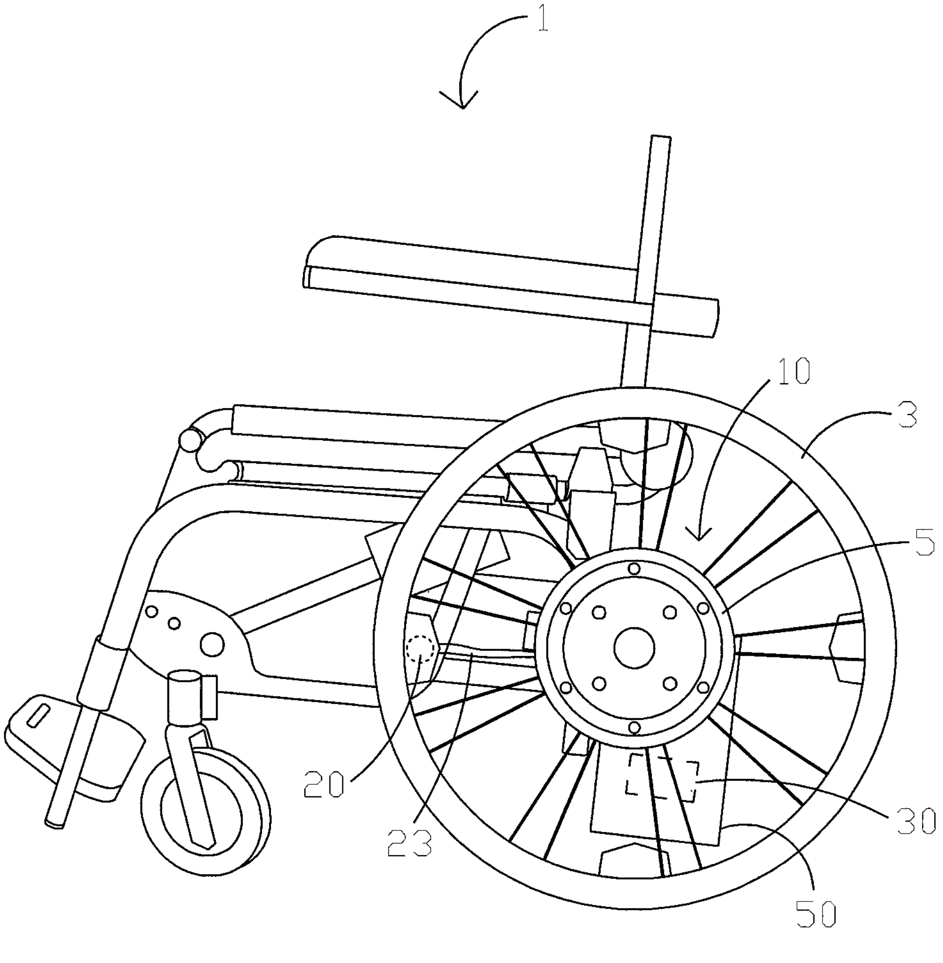
FIG. 1A is a schematic drawing showing structure of an embodiment of an auxiliary drive assembly for wheelchairs according to the present invention.
Figure 1B:
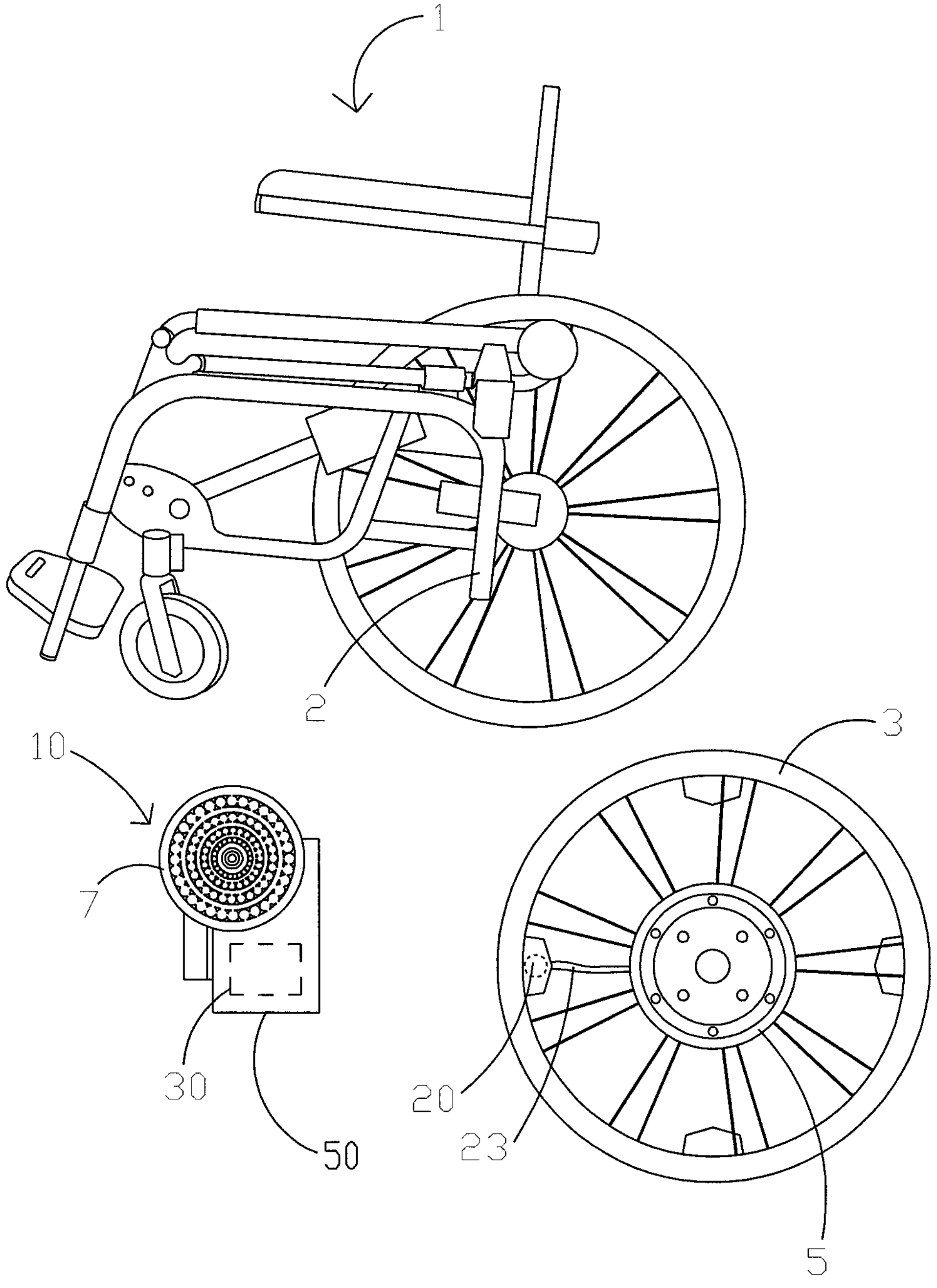
FIG. 1B is an explosive view of an embodiment of an auxiliary drive assembly for wheelchairs according to the present invention.
Figure 2A:
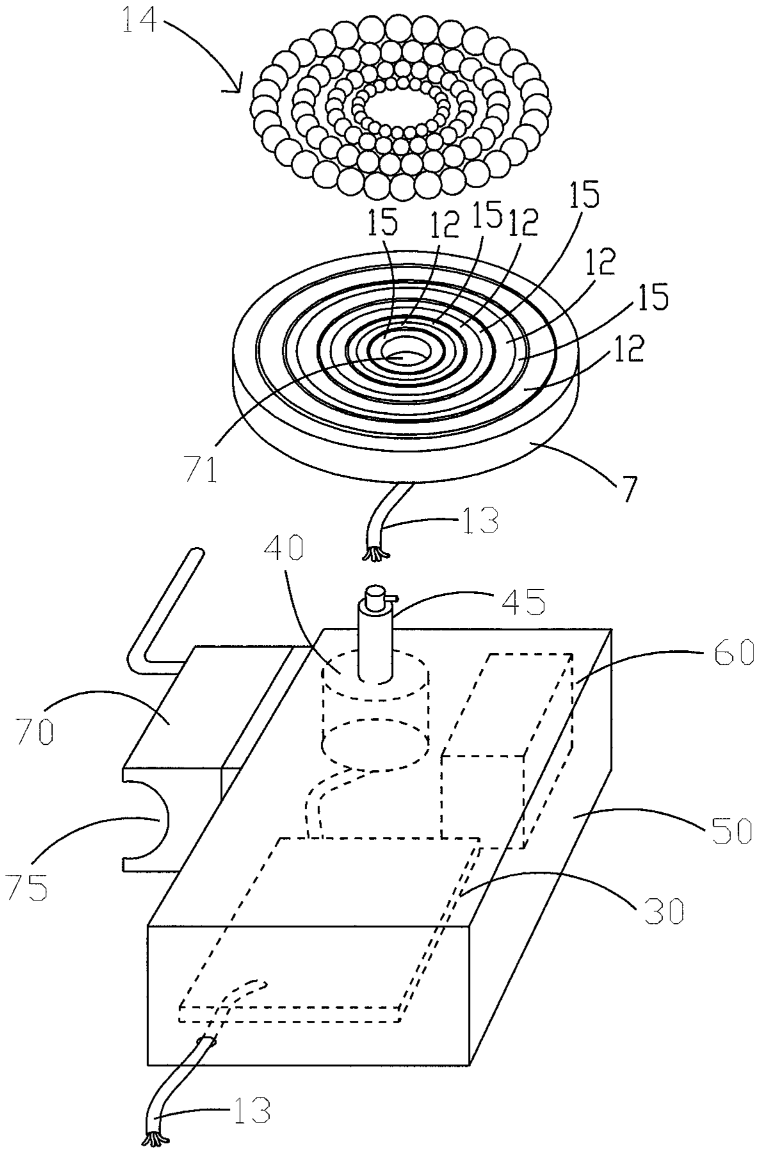
FIG. 2A is a schematic drawing showing structure of a drive unit and a wired transmission member of an embodiment according to the present invention.

Refer to FIG. 1A and FIG. 1B, an auxiliary drive assembly for wheelchairs of the present invention includes a wired transmission member 10, a sensor 20, a control circuit 30 and a drive unit 40 (shown in FIG. 2A). The wired transmission member 10 is disposed on a wheel hub 5 of a wheelchair 1. The wheel hub 5 is arranged at a wheel 3 of the wheelchair 1. Refer to FIG. 2A, a lower cover 7 is assembled with the wheel hub (shown in FIG. 3) correspondingly. The sensor 20 is disposed on the wheel 3 and is used for detecting a state of movement of the wheel 3 pushed by users. For example, displacement of the wheel or a force applied by users' push is sensed to generate a sensing signal. Then the sensing signal is sent to the wired transmission member 10 by a plurality of first transmission lines 23. The first transmission lines 23 are coupled to the sensor 20 and to the wired transmission member 10. The sensor 20 can be a displacement sensor or a force sensor, but not limited to these two kinds.

Refer to FIG. 1B and FIG. 2A, the control circuit 30 and the drive unit 40 are mounted in a box 50. The control circuit 30 is electrically coupled to the wired transmission member 10 and is used for receiving the sensing signal from the sensor 20 to generate a control signal according to the sensing signal. The drive unit 40 is coupled to the control circuit 30 and is receiving the control signal generated by the control circuit 30. Then the drive unit 40 drives the wheel hub 5 to rotate according to the control signal received so as to rotate the wheel 3. In a preferred embodiment, the drive unit 40 is a motor. When a user manually drives the wheelchair 1 by pushing the wheel 3 of the wheelchair 1 to rotate, the sensor 20 detects the state of the wheel 3, generates a sensing signal and sends the sensing signal to the wired transmission member 10. Next the sensing signal is sent to the control circuit 30. After receiving the sensing signal, the control circuit 30 generates a control signal according to the sensing signal and sends the control signal to the drive unit 40. Thus the drive unit 40 is controlled to drive the wheel hub 5 rotating and further the wheel 3 is driven to rotate. Therefore, the wheelchair is moved 1 easily and the human power required to move the wheelchair 1 is reduced due to the assistance provided by the auxiliary drive assembly.

Figure 2B:
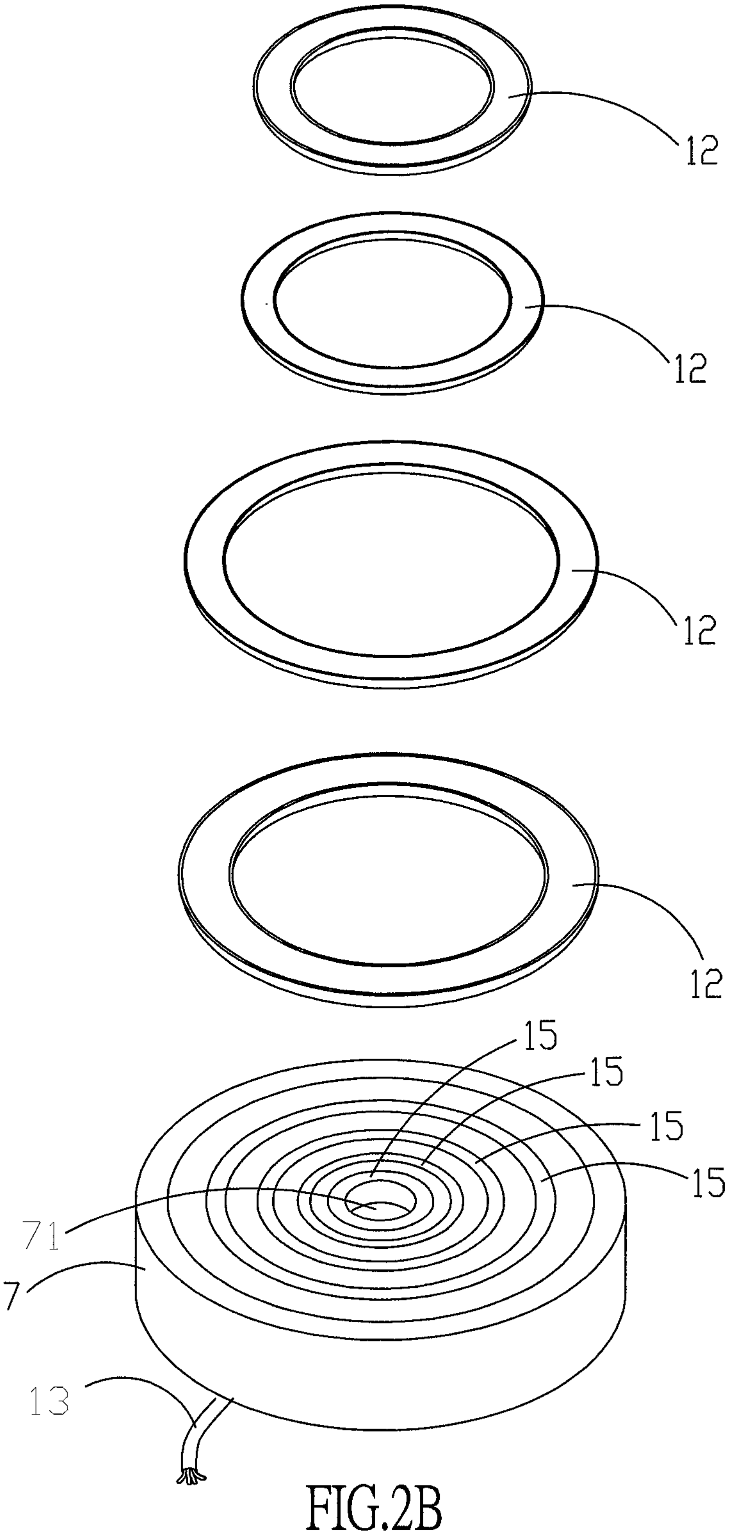
FIG. 2B is a schematic drawing showing structure of lower fixing plates of a wired transmission member and a lower cover of an embodiment according to the present invention.
Figure 3:
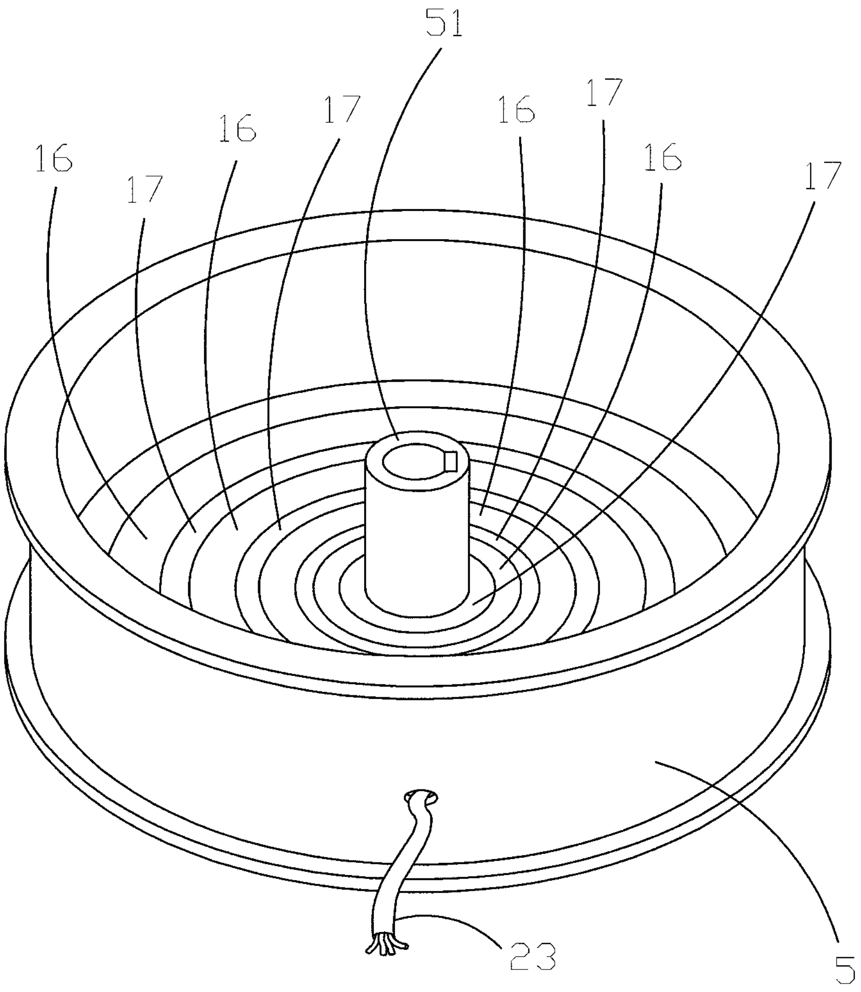
FIG. 3 is a schematic drawing showing structure of upper fixing plates of a wired transmission member and a wheel hub of an embodiment according to the present invention.

Refer to FIG. 2A, a schematic drawing showing structure of an embodiment with a drive unit and a wired transmission member is revealed. The wired transmission member 10 of the present invention is disposed on the wheel hub 5 of the wheelchair, as shown in FIG. 1A. The wheel hub 5 in FIG. 3 is assembled with the lower cover 7 correspondingly. As shown in FIG. 2A and FIG. 2B, the wired transmission member 10 consists of a plurality of lower fixing plates 12 and a plurality of rolling elements 14. The lower fixing plates 12 are mounted on the lower cover 7 while the rolling elements 14 are arranged in the lower fixing plates 12 respectively. In a preferred embodiment, the rolling elements 14 are balls or rollers.

Refer to FIG. 3, the wired transmission member 10 further includes a plurality of upper fixing plates 16 that is disposed on the wheel hub 5. The upper fixing plates 16 are corresponding to the lower fixing plates 12 (in FIG. 2A) of the lower cover 7. When the lower cover 7 is matched to the wheel hub 5, the rolling elements 14 are disposed between the upper fixing plates 16 and the lower fixing plates 12. A sleeve 51 is arranged at the wheel hub 5. The drive unit 40 passes through the sleeve 51 so as to move the wheel 3 of the wheelchair 1 by rotating the wheel hub 5.

Back to FIG. 2A, the control circuit 30 and the drive unit 40 are mounted in the box 50. The drive unit 40 includes a drive shaft 45 that passes through an insertion hole 71 of the lower cover 7 and inserts into the sleeve 51 of the wheel hub 5. The drive unit 40 drives the drive shaft 45 to rotate and further the wheel hub 5 is driven to rotate the wheel 3 of the wheelchair 1. The control circuit 30 is coupled to the drive unit 40 for control of the drive unit 40. The present invention further consist of a battery 60 that is coupled to the control circuit 30 for providing power to the control circuit 30 and further sending power to the drive unit 40 through the control circuit 30. In a preferred embodiment, the battery 60 is a rechargeable battery so that the present invention does not require frequent battery replacement. Moreover, the embodiment further includes a fixing member 70 that is set on the box 50 and is fixed on a support 2 in FIG. 1B of the wheelchair 1. Thus the box 50 is fixed on the support 2. The fixing member 70 includes a groove 75 for mounting the support 2.

The lower fixing plates 12, the rolling elements 14 and the upper fixing plates 16 of the wired transmission member 10 are made from electrical conductive material such as metal. The sensing signals are sent from the sensor 20 to the upper fixing plates 16 of the wired transmission member 10 by the first transmission lines 23. The first transmission lines 23 are connected to the upper fixing plates 16 respectively. Then the upper fixing plates 16 transmits the sensing signals to the lower fixing plates 12 through the rolling elements 14 while the lower fixing plates 12 are coupled to a plurality of second transmission lines 13 (as shown in FIG. 2A). The second transmission lines 13 are coupled to the control circuit 30 as to send the sensing signals to the control circuit 30. The number of the lower fixing plates 12 and of the upper fixing plates 16 are equal to the number of the first transmission lines 23 connected with the sensor 20. In this embodiment, as shown in FIG. 3, the sensor 20 is connected with four first transmission lines 23. Thus there are four upper fixing plates 16 (refer to FIG. 3) and four lower fixing plates 12 (as shown in FIG. 2B). Moreover, while arranging additional sensor 20 at the wheel 3, there is no need to increase the number of the lower fixing plates 12 as well as the upper fixing plates 16. The sensors 20 connected with the same transmission line can share the same upper fixing plate 16 and the same lower fixing plate 12. For example, the four first transmission lines 23 connected with the sensor 20 are marked in different colors-red, green, black and white respectively. Thus the first transmission lines 23 in the same color share the same upper fixing plate 16 and the same lower fixing plate 12. In the above embodiment, there are four first transmission lines 23. The number of the first transmission line 23 is not limited and is able to be modified according to users' requirements.

By the wired transmission member 10, the sensing signals from the sensor 20 are sent to the control circuit 30. Through wired transmission paths, the sensing signals are sent to the control circuit 30 so that the sensing signals are transmitted without the interference in the environment and the sensing signals are sent to the control circuit 30 exactly so as to control rotation of the wheel 3 of the wheelchair 1 precisely. The user drives the wheelchair 1 easily with assistance provided by the auxiliary drive assembly. Furthermore, the manufacturing cost of the device is reduced due to wired transmission of the sensing signals.

Refer to FIG. 2B, the wired transmission member 10 further includes a lower insulator 15 disposed between two adjacent lower fixing plates 12 for insulating the lower fixing plates 12 from each other. Thus the lower fixing plates 12 have no electrical contact with one another. Back to FIG. 3, an upper insulator 17 is arranged between two adjacent upper fixing plates 16 so as to insulate the upper fixing plates 16 from each other. Thus there is no electrical contact between the upper fixing plates 16.

In summary, an auxiliary drive assembly for wheelchairs of the present invention is composed of a wired transmission member, at least one sensor, a control circuit and a drive unit. The sensor is disposed on a wheel and is used for detecting a state of movement of a wheel being driven by users and generating a sensing signal that is sent to the wired transmission member. The control circuit is coupled to the wired transmission member and is for receiving the sensing signal so as to generate a control signal for control of the drive unit. A wheel hub is rotated by the drive unit and further driving the wheel to rotate. The signal transmission of the present invention is by wired transmission so that the signals are transmitted to the control circuit without interference and rotation of the wheel of the wheelchair is controlled precisely. Thus energy needed to push the wheelchair is reduced by the auxiliary drive assembly. Moreover, the auxiliary drive assembly is with simple structure and the signals are transmitted in a wired way so that the manufacturing cost is down.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An auxiliary drive assembly for wheelchairs comprising:

a wired transmission member that is arranged at a wheel hub and the wheel hub is disposed on a wheel of a wheelchair;

at least one sensor set on the wheel and generating at least one sensing signal that is sent to the wired transmission member;

a control circuit coupled to the wired transmission member and receiving the sensing signal for generating a control signal; and a drive unit coupled to the control circuit and receiving the control signal so as to drive the wheel hub rotating according to the control signal and further move the wheel;

wherein the wired transmission member includes:

a plurality of upper fixing plates that is disposed on the wheel hub;

a plurality of lower fixing plates that is arranged at a lower cover while the lower cover and the wheel hub are matched to each other;

at least one upper insulator arranged between the upper fixing plates so as to insulate the upper fixing plates from each other;

at least one lower insulator disposed between the lower fixing plates for insulating the lower fixing plates from each other; and a plurality of rolling elements set between the upper fixing plates and the lower fixing plates.

2. The device as claimed in claim 1, wherein the rolling elements are a plurality of balls or a plurality of rollers.

3. The device as claimed in claim 1, wherein the upper fixing plates, the lower fixing plates, and the rolling elements are made from electrical conductive material.

4. The device as claimed in claim 1, wherein the auxiliary drive assembly for wheelchairs further comprising:

a plurality of first transmission lines that is connected to the sensor and to the upper fixing plates so as to send the sensing signal from the sensor to the upper fixing plates and then the sensing signal is sent to the lower fixing plates through the rolling elements; and a plurality of second transmission lines that is connected to the lower fixing plates and the control circuit so as to transmit the sensing signal to the control circuit.

5. The device as claimed in claim 1, wherein the sensor is a displacement sensor.

6. The device as claimed in claim 1, wherein the auxiliary drive assembly for wheelchairs further having:

a sleeve that is arranged at the wheel hub while the drive unit passes through the sleeve for driving the wheel hub rotating and further moving the wheel.

7. The device as claimed in claim 6, wherein the drive unit includes a drive shaft that inserts into the sleeve to drive the wheel to rotate and further cause the wheel to move.

8. The device as claimed in claim 7, wherein the drive unit is a motor.

9. The device as claimed in claim 1, wherein the auxiliary drive assembly for wheelchairs further comprising:

a plurality of first transmission lines that is connected to the sensor and to the wired transmission member so as to send the sensing signal from the sensor to the wired transmission member; and a plurality of second transmission lines that is connected to the wired transmission member and the control circuit so as to transmit the sensing signal to the control circuit.

10. The device as claimed in claim 1, wherein the auxiliary drive assembly for wheelchairs further having a battery coupled to the control circuit and sending power to the control circuit.

11. The device as claimed in claim 10, wherein the battery is a rechargeable battery.

12. The device as claimed in claim 1, wherein the auxiliary drive assembly for wheelchairs further comprising a fixing member that is disposed on a box and is fixed on a support of the wheelchair; the drive unit and the control circuit are mounted in the box.

* * * * *